(12) United States Patent
Pouliot

(10) Patent No.: US 7,739,735 B2
(45) Date of Patent: Jun. 15, 2010

(54) SYSTEM AND METHOD FOR DYNAMIC OPTIMIZATIONS USING SECURITY ASSERTIONS

(75) Inventor: Sebastien Pouliot, Beauport (CA)

(73) Assignee: Novell, Inc., Provo, UT (US)

( * ) Notice: Subject to any disclaimer, the term of this patent is extended or adjusted under 35 U.S.C. 154(b) by 993 days.

(21) Appl. No.: 11/493,010

(22) Filed: Jul. 26, 2006

(65) Prior Publication Data

US 2008/0028461 A1    Jan. 31, 2008

(51) Int. Cl.
*G06F 21/00* (2006.01)
(52) U.S. Cl. .......................................... 726/21; 713/189
(58) Field of Classification Search .................... 726/21
See application file for complete search history.

(56) References Cited

U.S. PATENT DOCUMENTS

| | | | |
|---|---|---|---|
| 5,452,457 A | 9/1995 | Alpert et al. ................. | 395/700 |
| 6,071,316 A | 6/2000 | Goossen et al. ................. | 717/4 |
| 6,230,312 B1 * | 5/2001 | Hunt ........................... | 717/108 |
| 6,282,701 B1 | 8/2001 | Wygodny et al. .............. | 717/4 |
| 6,308,275 B1 | 10/2001 | Vaswani et al. ............. | 713/201 |
| 6,560,774 B1 * | 5/2003 | Gordon et al. .............. | 717/146 |
| 6,615,264 B1 | 9/2003 | Stoltz et al. .................. | 709/227 |
| 6,802,054 B2 | 10/2004 | Faraj ........................... | 717/128 |
| 6,871,284 B2 | 3/2005 | Cooper et al. ............... | 713/200 |
| 6,971,091 B1 | 11/2005 | Arnold et al. ............... | 717/145 |
| 7,069,554 B1 | 6/2006 | Stammers et al. ........... | 717/178 |
| 7,487,221 B2 | 2/2009 | Araki ......................... | 709/208 |
| 7,512,965 B1 | 3/2009 | Amdur et al. .................. | 726/1 |
| 7,552,472 B2 | 6/2009 | Baffes et al. .................. | 726/22 |
| 7,620,940 B2 | 11/2009 | Goldsmith et al. .......... | 717/127 |
| 2002/0042897 A1 | 4/2002 | Klein et al. .................. | 714/718 |

(Continued)

OTHER PUBLICATIONS

Clark, Jason, "Return of the Rich Client—Code Access Security and Distribution Features in .Net Enhance Client-Side Apps", *MSDN Magazine*, printed from http://msdn.microsoft.com/msdnmag/issues/02/06/rich/default.aspx, Jun. 2002, 16 pages.

(Continued)

*Primary Examiner*—Nasser Moazzami
*Assistant Examiner*—Ghazal Shehni
(74) *Attorney, Agent, or Firm*—Pillsbury Winthrop Shaw Pittman LLP

(57) ABSTRACT

The invention relates to a system and method for efficient security runtime. If the same security demand for permissions occurs twice during the same code path (i.e. execution stack) the latter can be automatically turned (optimized) into a security assertion based on the former demand. A security runtime can determine which assertions to establish in a call stack, using declarative security information kept in an assembly metadata and based on execution history to know what has already been demanded for a specific stack frame. If the method being called has been allowed to execute before then a demand may be replaced with an assertion for the same permissions within the call stack. If that frame was executed then it means the security demand was successfully evaluated. Furthermore, if the permission evaluation result is known to be static (e.g., its result will not change) it can be determined that another check on the same permissions is not required higher on the stack, so this demand can safely be replaced by an assertion, which can effectively speed up the code execution without sacrificing security.

20 Claims, 4 Drawing Sheets

U.S. PATENT DOCUMENTS

| | | | |
|---|---|---|---|
| 2002/0069200 A1 | 6/2002 | Cooper et al. | 707/9 |
| 2002/0198675 A1 | 12/2002 | Underseth et al. | 702/122 |
| 2003/0041267 A1 | 2/2003 | Fee et al. | 713/201 |
| 2003/0065942 A1 | 4/2003 | Lineman et al. | 713/201 |
| 2003/0110192 A1 | 6/2003 | Valente et al. | 707/513 |
| 2003/0115484 A1 | 6/2003 | Moriconi et al. | 713/201 |
| 2003/0177355 A1 | 9/2003 | Elgressy et al. | 713/167 |
| 2003/0196114 A1 | 10/2003 | Brew et al. | 713/201 |
| 2003/0225822 A1 | 12/2003 | Olson et al. | 709/202 |
| 2004/0103323 A1 | 5/2004 | Dominic | 713/202 |
| 2004/0250112 A1 | 12/2004 | Valente et al. | 713/200 |
| 2005/0071668 A1 | 3/2005 | Yoon et al. | 713/200 |
| 2005/0172126 A1* | 8/2005 | Lange et al. | 713/166 |
| 2005/0240999 A1 | 10/2005 | Rubin et al. | 726/22 |
| 2005/0262517 A1 | 11/2005 | French | 719/316 |
| 2006/0064737 A1 | 3/2006 | Wallace | 726/1 |
| 2006/0117299 A1 | 6/2006 | Goldsmith et al. | 717/124 |
| 2006/0143396 A1 | 6/2006 | Cabot | 711/134 |
| 2006/0150021 A1 | 7/2006 | Traskov et al. | 714/37 |
| 2006/0235655 A1 | 10/2006 | Qing et al. | 702/186 |

OTHER PUBLICATIONS

MONO, "MONO:Runtime—The Mono Runtime", printed from http://www.mono-project.com/Mono:Runtime, Jan. 24, 2006, 8 pages.

MONO, "Assemblies and the GAC—How Mono Finds Assemblies", printed from http://www.mono-project.com/Assemblies_and_the_GAC, Jul. 20, 2005, 11 pages.

Damianou, Nicodemos C., "A Policy Framework for Management of Distributed Systems", Thesis, Imperial College of Science, Technology and Medicine, University of London, Department of Computing, Feb. 2002, 233 pages.

Oaks, Scott, "Java Security, $2^{nd}$ Edition", Publisher O'Reilly Media, Inc., May 17, 2001, 22 pages.

Sundmark et al., "Monitored Software Components—A Novel Software Engineering Approach", *Proceedings of the $11^{th}$ Asia-Pacific Software Engineering Conference* (APSEC'04), Nov. 30-Dec. 3, 2004, pp. 624-631.

Sokolsky et al., "Steering of Real-Time Systems Based on Monitoring and Checking", *Proceedings of the Fifth International Workshop*, Nov. 18-20, 1999, pp. 11-18.

* cited by examiner

Fig. 1 – prior art

SYSTEM AND METHOD FOR DYNAMIC OPTIMIZATIONS USING SECURITY ASSERTIONS

FIELD OF INVENTION

The present invention is a computer programming system and method for implementing dynamic optimization for safely replacing previous successful permission demands with security assertions.

BACKGROUND

ECMA-335 is an international standard that defines a Common Language Infrastructure (CLI) in which applications written in multiple high-level languages can be executed in different system environments without the need to rewrite those applications to take into consideration the unique characteristics of those environments. Unfortunately, malicious applications running un-trusted code (e.g., downloaded applications from the Internet) can present potential risks to local secured computer resources. Code Access Security (CAS) is a well known security mechanism, implemented on computers with an ECMA-335 virtual machine (VM), to limit what managed code can do and access on the computer. In CAS permissions are granted, or refused, based on code evidences and security policies. Resources (e.g., assemblies) can specify requested permissions by using declarative security, which uses attributes to place security information into the metadata of the resource. At runtime if the code attempts to access any resource which requires permissions as specified by declarative security, a demand is issued to determine whether the code calling the resource and all other codes that have been called up that point (call stack) satisfies the requested permissions. If so, access to the resource is allowed, otherwise a security exception is thrown. CAS enforces this by doing "stack walks" where every method on the call stack (e.g., the chain of code being executed) is evaluated for the demanded permission. Although time consuming, this prevents luring attacks by less trusted code that can sit between a trusted application (bottom of the stack) and the code accessing the resource (top of the stack).

A call stack is divided up into contiguous pieces called stack frames, or frames for short; each frame is the data associated with one call to one function, also known as "method". When a demand for permission is executed CAS starts a stack walk for every frame in the execution stack, starting with the current caller method. Each stack frame, as well as assembly and application domain transitions, are evaluated to see if they satisfy the condition required by the permission.

Executing stack walks is a heavyweight process, but it does ensure that every caller (e.g., method call) has access to a resource before executing the code. However in some cases, like iterations or recursion, having multiple stack walks for the same set of permissions and the same call stalk (e.g. iterations), or a superset of the stack (e.g. recursion), does not augment security but greatly impacts application performance.

For such conditions, CAS includes a mechanism called an assertion, which allows the reduction of permissions checks up to a point in the stack walk where permissions do not need to be verified. For example, if a frame in a call stack asserts a permission to read files, then this permission is not checked for the frames above the frame that made the assertion. It can be safely assumed that the asserted permission has been determined to be allowed for all the above frames. Assertions, even if indirectly, are time savers because they reduce the number of stack frames to process. Using asserts for non-security purposes like performance optimizations, however, can be potentially harmful because they reduce the number of security checks done at runtime. Assertions require careful and manual auditing and any error (e.g. demand for permissions not executed) can lead to security vulnerabilities in applications.

FIG. 1 is block diagram of a security assertion in normal operation. By way of illustration, Assembly A may be an application from the Internet which calls Assembly B. Assembly B may be local code from a base class library. If a method inside Assembly B asserts a permission, a stack walk is prevented from proceeding up the call stack beyond the code that asserted the permission, which in this case is Method B1. If a demand is later made for the same permission (s), the call stack is checked once again, up to the point where the permission was previously asserted, and no further. Thus, in prior art systems even if code higher on the call stack (Assembly A) does not have the requisite permission(s) to access the resource, they can still access it because the stack walk is stopped before reaching that stack frame (or application domain/assembly transition). Since assertions remove security requirements, an incorrectly used assertion has the potential of opening up security vulnerabilities.

Problems of the present implementations are that most stack walks are invisible or unknown to the programmer; hence any performance problem is hard to diagnose. Using manual assertions is difficult and potentially harmful (if misused) making this mechanism a dangerous one to solve performance issues. As such, there is a need for safe performance optimizations that does not have the drawbacks of current implementations.

SUMMARY

Various aspects of the invention overcome at least some of these and other drawbacks of known systems. According to one embodiment of the invention, a system and method is provided for performing dynamic security optimization during application runtime for evaluating security demands for permissions and, when possible, promoting the demands into security assertions on the same permissions. This is possible by determining whether the permissions are static permissions (e.g., its results, under the same conditions, do not change) and were they were first successfully executed in the same stack. If these conditions are fulfilled, the demand may be safely replaced with an assertion in the stack frame.

The present invention employs dynamic optimizations using previously evaluated and successful demands and replaces them, when conditions are met, with security assertions. Assertions added dynamically during execution, for known safe parts, allows a gain in performance (e.g. iterations and recursion) without any of the previously cited problems.

These and other objects, features and advantages of the invention will be apparent through the detailed description of the embodiments and the drawings attached hereto. It is also to be understood that both the foregoing general description and the following detailed description are exemplary and not restrictive of the scope of the invention.

DETAILED DESCRIPTION OF DRAWINGS

DETAILED DESCRIPTION

Figure 1:
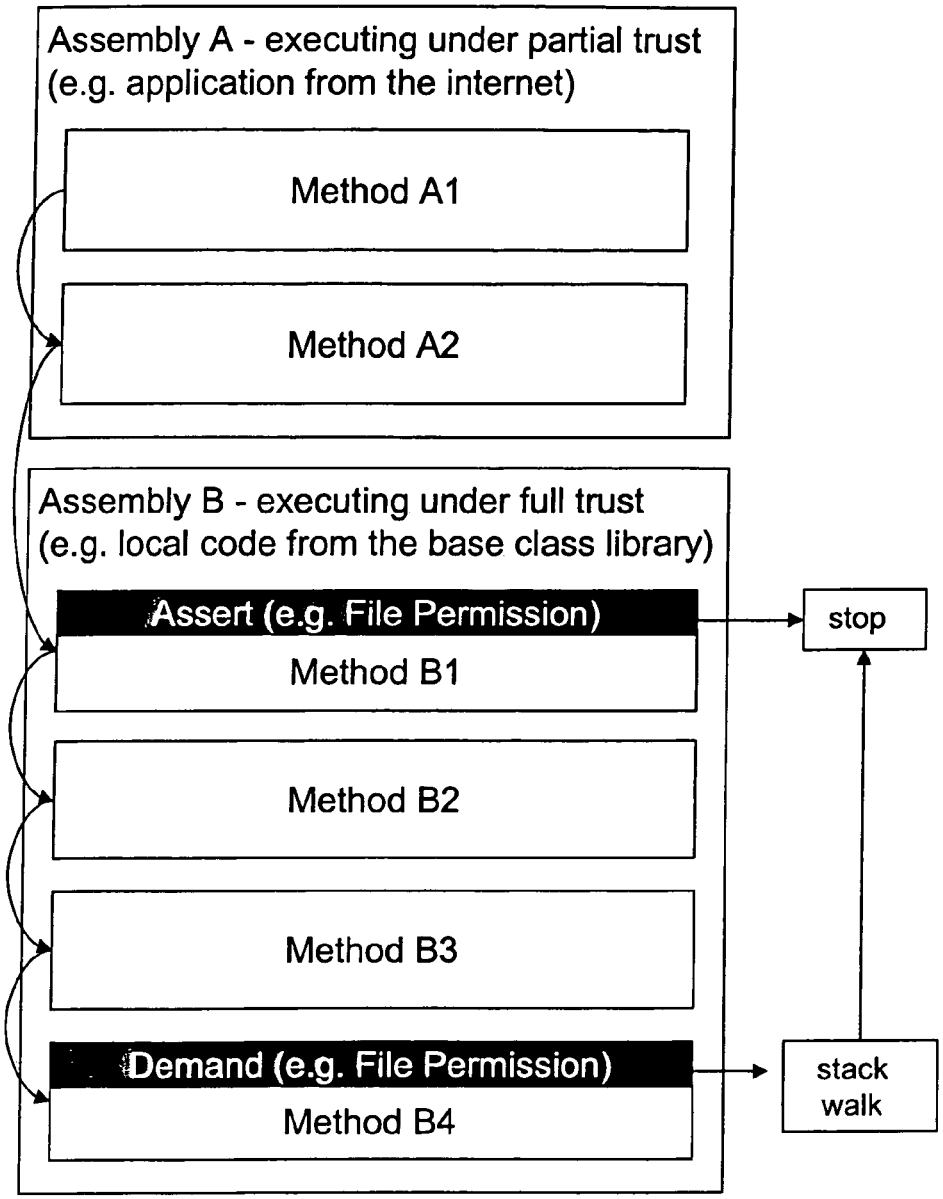
FIG. 1 is a block diagram of a code call stack according to prior art.

The present invention employs dynamic optimizations using past evaluated and successful permission demands within a current runtime call stack, and replaces them with security assertions (for the same set of permissions). Dynamic optimization may be applied to CAS demands in order to safely increase performance without sacrificing security. Adding assertions dynamically during execution, for known safe parts, allows a gain in performance (e.g. iterations and recursion) without any of the previously cited problems.

The permission demand (herein referred to as "demand") may be turned into an assertion if the demand has been successfully executed (e.g. in a previous stack-walk, higher in the runtime call stack) in the current call stack. Other considerations include determining if the permission was made using declarative syntax and if the permission is known to be static (e.g., that it will always resolve to the same result). If a demand for a permission fulfilling all of these criteria is encountered, then a stack walk can be avoided, interrupted or, at least, shortened. Replacing a demand with an assertion, under the right conditions, saves both execution resources (e.g. memory) and time during execution. Furthermore the optimization does not require any source code change or programmer awareness.

The invention may be used at a computer on a network or any other computer or device with an ECMA-335 Virtual Machine (VM). According to one embodiment of the invention, shown in FIG. 2, a system is provided that includes at least one computer terminal 200 (e.g., client terminal) having a processor, a memory, a display and at least one input mechanism (e.g., keyboard or other input mechanism) (not shown). The computer terminal 200 may be connected or connectable to other computer terminals via wired, wireless, and/or a combination of wired and wireless connections and/or to servers via wired, wireless, and/or a combination of wired and wireless connections. Application sources 230 and assembly sources 240 may communicate over a communications connection to the computer 200. The computer 200 may be linked to network 250 using other conventional network communication means. The network 250 may also be one or more various network types including, but not limited to, LAN, WAN, or Internet.

Figure 2:
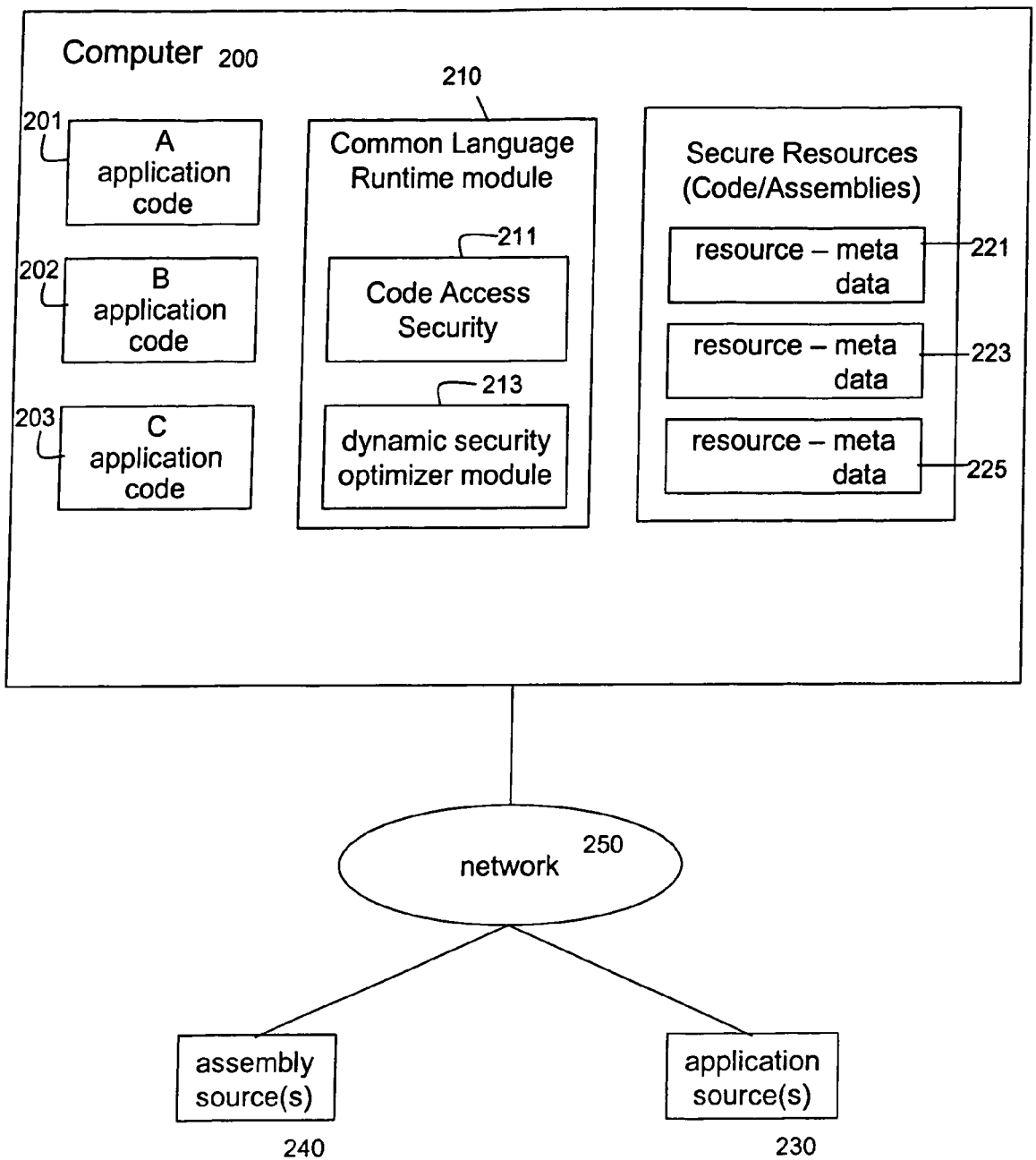
FIG. 2 is a high-level block diagram according to one embodiment of the invention.

As shown in FIG. 2 the computer system 200 may include one or more applications (201, 202, 203) for execution on computer 200. Execution may be carried out using Common Language Runtime (CLR) module 210, where Code Access Security (CAS 211) may be employed to make security decisions during execution. The dynamic security optimizer module 213 may be used to transform security demands into assertions during runtime, if they are judged safe to promote. Secure recourses (221, 223, 225) stored at computer 200 may include code libraries, assemblies, and/or other resources. Metadata associated with the resources can include declarative security information for accessing other resources. Declarative security information may include static attributes kept in the assembly metadata, which identifies security information that can be used in the optimization process.

The present invention allows ECMA-335 VM supporting Code Access Security (CAS) to dynamically optimize some of the declarative security demands by turning them into assertions. Depending on the call stack depth (e.g., number of frames in a call stack) and the usage (e.g. iterations and recursion) this optimization can yield a performance increase while still ensuring the same level of security as the original implementation.

Application code (201, 202, 203) on a computer may originate from various sources that are either: secure, un-secure, or semi-secure. Application code may be downloaded to a computer via the network connection with the application source 230. Other sources may be included (e.g., hard disk, CD, drive storage).

Application runtime may be initiated by remote or local user of the computer 200 or automatically initiated locally or from a remote location without user intervention. CLR module 210 can be used during execution of an application. During runtime, code may have the potential to perform many functions as programmed. These functions may include calling code from various secure resources (221, 223, 225). The shared resources may be programmed with permission attributes using declarative security within the metadata of the resource. The declarative security attributes may be read (e.g., by the CLR module 210) during runtime access to resources. The attributes may define the minimal permissions needed by code calling the resource during runtime. The demand for permissions may be dynamically evaluated based on the various factors including, characteristics of the code (e.g., origin, name, location, size, etc) and/or the call stack.

Figure 3:
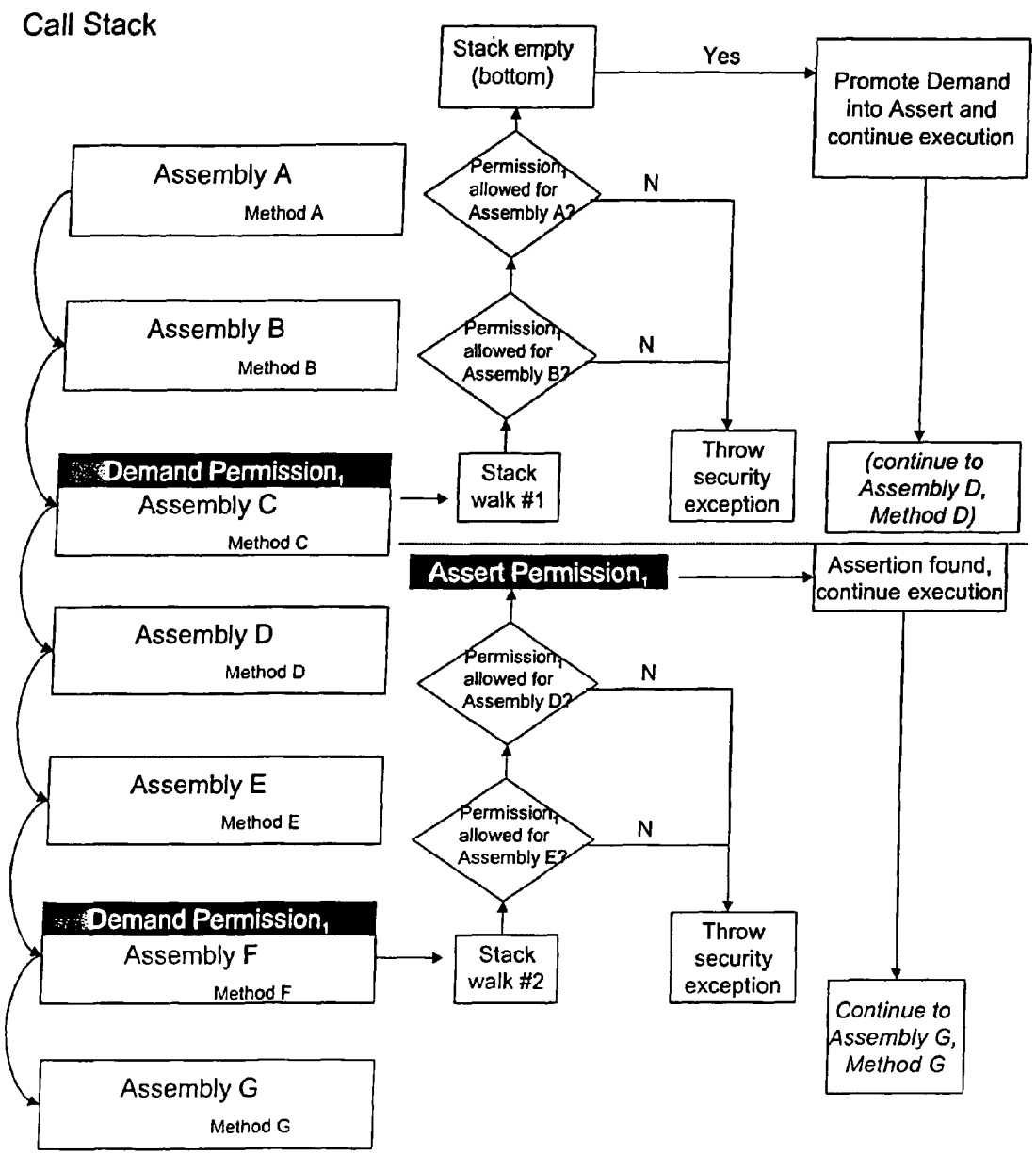
FIG. 3 is block diagram for a code call stack according to one embodiment of the invention.

FIG. 3 is a visual representation of some of the decisions made during runtime. By way of example, a resource, exemplified as Assembly A, may execute a function (Method A) which calls a function (Method B) of another resource (Assembly B) and the called function (Method B) may call another function (Method C) of another resource (Assembly C), and so on.

During runtime a resource may demand a specified permission (Permission$_1$) from the calling code. For example, with respect to FIG. 3, Assembly C may demand that the method calling it, Method B of Assembly B (including its callers, Method A of Assembly A) have the specified permission. To prevent unsecured access from an indirect source (e.g., Assembly A), each of the methods and assembly transitions up to the "bottom of the stack" (Assembly A) are verified for the same permission (Permission$_1$). Any calls into Method C will provoke a stack walk to verify the requested permission (s) are allowed for each caller.

As execution continues, the same demand for Permission$_1$ may be made at later during runtime (Method F in Assembly F). At such time, another stack walk (stack walk #2) is started. However, the second stack walk, as illustrated, is performed until a point in the stack walk where the same permission was previously made. In the illustrated example, the second stack walk would stop at Method C of Assembly C where the permission would be asserted.

Figure 4:
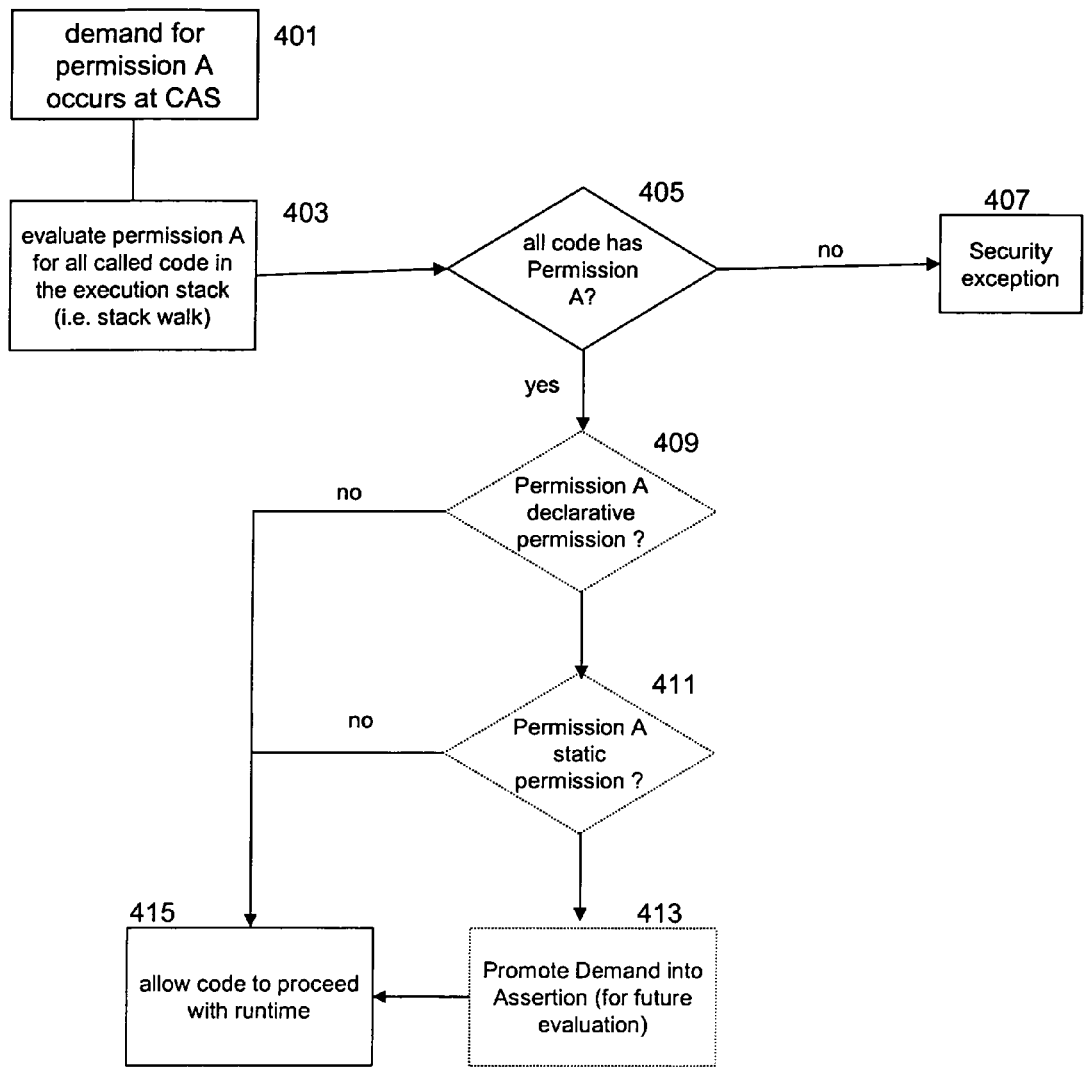
FIG. 4 is a flow chart for a method according to one embodiment of the invention.

From the dynamic security optimizer 213 point of view, dynamic optimization may be applied at the time of the demand. FIG. 4 is a flow diagram of the runtime security for permission demands. By way of example, during runtime a demand for Permission$_4$ may be made (similar to demand for Permission$_1$ illustrated in FIG. 3) to the CAS 211. In step 403, Permission$_4$ is evaluated for all called code in the execution stack. This is similar to stack walk #1 illustrated in FIG. 3. A determination may be made at step 405 as to whether the stack walk completed without throwing a security exception. If not, the process ends with a security exception (step 407). If the stack walk successfully completes without a security exception then the permission may be checked to determine whether it is a declarative permission (e.g., coming from the assembly metadata). If not, runtime may proceed as normal and the demand for permission is carried out in a conventional manner in step 415. If, however, the permission is declarative, another determination may be made as to whether the permission is static in step 411. If not static, runtime may proceed as normal in step 415. If the permission is static, then the original demand from step 401 (demand for Permission$_A$) may be promoted into an assertion in step 413 for future evaluation. Thus, if the demand for Permission$_A$ is made again, in the same execution stack, it will automatically be executed as an assertion. This promotion (from a demand to an assert) will effectively shortcut any further stack-walk, initiated from further up in the stack, for the same permissions. In performing such an optimization, performance may be increased without making a sacrifice in security.

Aspects that may be considered when determining whether to promote a security demand into an assertion may include, but are not limited to, whether the permission demand was previously successfully executed; whether the permission was made using the declarative syntax (e.g., present in assembly metadata); and/or whether the permission is known to have a static result. Other consideration may be determined.

In the foregoing specification, the invention has been described with reference to specific embodiments thereof. Various modifications and changes may be made thereto without departing from the broader spirit and scope of the invention. The specification and drawings are, accordingly, to be regarded in an illustrative rather than a restrictive sense.

I claim:

1. A method for dynamic optimizations using security assertions, comprising:
    initiating a runtime module on a computer, wherein the runtime module is configured to execute an application that includes a call stack having a plurality of sequential stack frames;
    performing, during the execution of the application in the runtime module, a first stack walk in response to a first runtime call into a first one of the plurality of sequential stack frames in the call stack including a first demand that requests at least one permission, wherein the first stack walk includes:
        evaluating the plurality of sequential stack frames in the call stack from the first stack frame that includes the first demand to a bottom of the call stack;
        granting the first demand for the at least one permission in response to all of the stack frames evaluated in the call first stack satisfying the at least one permission; and
        promoting the first demand for the at least one permission into an assertion for the at least one permission in response to granting the first demand and further in response to the at least one permission satisfying one or more predetermined conditions; and
    performing, during the execution of the application in the runtime module, a second stack walk in response to a second runtime call into a second one of the plurality of sequential stack frames in the call stack including a second demand that requests the at least one permission, wherein the second stack walk includes:
        evaluating the plurality of sequential stack frames in the call stack from the second stack frame that includes the second demand for the at least one permission to the first stack frame that includes the assertion for the at least one permission; and
        granting the second demand for the at least one permission in response to all of the stack frames evaluated in the call second stack walk satisfying the at least one permission.

2. The method of claim 1, wherein promoting the first demand for the at least one permission into the assertion for the at least one permission results in the second stack walk not having to evaluate the stack frames evaluated in the first stack walk.

3. The method of claim 1, wherein the first stack walk and the second stack walk further include determining that the at least one permission satisfies the one or more predetermined conditions in response to determining that the at least one permission is declarative and static.

4. The method of claim 3, wherein the first stack walk and the second stack walk further include determining that the at least one permission does not satisfy the one or more predetermined conditions in response to determining that the at least one permission is not declarative or not static.

5. The method of claim 1, wherein the runtime module executes the application within a virtual machine executing on the computer.

6. The method of claim 1, wherein the computer receives the application that executes in the runtime module over a network connection that links the computer to an application server.

7. The method of claim 1, wherein:
    the first stack walk further includes creating a first security exception in response to at least one of the stack frames evaluated in the first stack walk not satisfying the at least one permission; and
    the second stack walk further includes creating a second security exception in response to at least one of the stack frames evaluated in the second stack walk not satisfying the at least one permission.

8. The method of claim 1, wherein the second stack walk further includes promoting the second demand for the at least one permission into a second assertion for the at least one permission in response to granting the second demand and further in response to the at least one permission satisfying the one or more predetermined conditions.

9. The method of claim 8, further comprising performing, during the execution of the application in the runtime module, one or more subsequent stack walks in response to one or more subsequent runtime calls into subsequent ones of the plurality of sequential stack frames in the call stack including subsequent demands that request the at least one permission.

10. The method of claim 9, wherein promoting the second demand for the at least one permission into the second assertion for the at least one permission results in the subsequent stack walks not having to evaluate the stack frames evaluated in the first stack walk and the second stack walk.

11. A system for dynamic optimizations using security assertions, comprising:
    a computer configured to receive a request to execute an application that includes a call stack having a plurality of sequential stack frames;
    a runtime module that executes the application on the computer with code access security, wherein the runtime module is configured to:
        perform, during the execution of the application in the runtime module, a first stack walk in response to a first runtime call into a first one of the plurality of sequential stack frames in the call stack including a first demand that requests at least one permission, wherein the first stack walk includes:
            evaluating the plurality of sequential stack frames in the call stack from the first stack frame that includes the first demand to a bottom of the call stack;

granting the first demand for the at least one permission in response to all of the stack frames evaluated in the call first stack walk satisfying the at least one permission; and promoting the first demand for the at least one permission into an assertion for the at least one permission in response to granting the first demand and further in response to the at least one permission satisfying one or more predetermined conditions; and perform, during the execution of the application in the runtime module, a second stack walk in response to a second runtime call into a second one of the plurality of sequential stack frames in the call stack including a second demand that requests the at least one permission, wherein the second stack walk includes:

evaluating the plurality of sequential stack frames in the call stack from the second stack frame that includes the second demand for the at least one permission to the first stack frame that includes the assertion for the at least one permission; and granting the second demand for the at least one permission in response to all of the stack frames evaluated in the call second stack walk satisfying the at least one permission.

12. The system of claim 11, wherein promoting the first demand for the at least one permission into the assertion for the at least one permission results in the second stack walk not having to evaluate the stack frames evaluated in the first stack walk.

13. The system of claim 11, wherein the first stack walk and the second stack walk further include determining that the at least one permission satisfies the one or more predetermined conditions in response to determining that the at least one permission is declarative and static.

14. The system of claim 13, wherein the first stack walk and the second stack walk further include determining that the at least one permission does not satisfy the one or more predetermined conditions in response to determining that the at least one permission is not declarative or not static.

15. The system of claim 11, further comprising a virtual machine executing on the computer, wherein the runtime module executes the application within the virtual machine.

16. The system of claim 11, wherein the computer receives the application that executes in the runtime module over a network connection that links the computer to an application server.

17. The system of claim 11, wherein:

the first stack walk further includes creating a first security exception in response to at least one of the stack frames evaluated in the first stack walk not satisfying the at least one permission; and the second stack walk further includes creating a second security exception in response to at least one of the stack frames evaluated in the second stack walk not satisfying the at least one permission.

18. The system of claim 11, wherein the second stack walk further includes promoting the second demand for the at least one permission into a second assertion for the at least one permission in response to granting the second demand and further in response to the at least one permission satisfying the one or more predetermined conditions.

19. The system of claim 18, wherein the runtime module is further configured to perform, during the execution of the application in the runtime module, one or more subsequent stack walks in response to one or more subsequent runtime calls into subsequent ones of the plurality of sequential stack frames in the call stack including subsequent demands that request the at least one permission.

20. The system of claim 19, wherein promoting the second demand for the at least one permission into the second assertion for the at least one permission results in the subsequent stack walks not having to evaluate the stack frames evaluated in the first stack walk and the second stack walk.

* * * * *